US008848150B2

(12) United States Patent
Yoso et al.

(10) Patent No.: US 8,848,150 B2
(45) Date of Patent: Sep. 30, 2014

(54) LIQUID CRYSTAL DISPLAY AND ELECTRONIC DEVICE

(75) Inventors: Aya Yoso, Ehime (JP); Hayato Kurasawa, Kanagawa (JP); Toshiharu Matsushima, Tottori (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 38 days.

(21) Appl. No.: 13/242,862

(22) Filed: Sep. 23, 2011

(65) Prior Publication Data

US 2013/0077004 A1    Mar. 28, 2013

(51) Int. Cl.
*G02F 1/1343* (2006.01)
*G02F 1/1362* (2006.01)
*G02F 1/13* (2006.01)

(52) U.S. Cl.
CPC .......... *G02F 1/136213* (2013.01); *G02F 2001/134345* (2013.01); *G02F 1/134363* (2013.01); *G02F 1/1323* (2013.01)
USPC .......................................... 349/139; 349/106

(58) Field of Classification Search
CPC .............................................. G02F 1/133345
USPC .............................................. 349/37, 38, 39
See application file for complete search history.

(56) References Cited

U.S. PATENT DOCUMENTS

| | | | |
|---|---|---|---|
| 6,958,791 B2 * | 10/2005 | Shimoshikiryo | 349/85 |
| 2004/0150777 A1 * | 8/2004 | Koike | 349/139 |
| 2006/0284803 A1 * | 12/2006 | Ikeda | 345/76 |
| 2007/0040975 A1 | 2/2007 | Momoi | |
| 2007/0121047 A1 * | 5/2007 | Chung et al. | 349/141 |
| 2008/0185959 A1 * | 8/2008 | Kurauchi | 313/504 |
| 2009/0231530 A1 * | 9/2009 | Nishimura | 349/129 |
| 2010/0128208 A1 * | 5/2010 | Kurasawa | 349/106 |
| 2010/0149449 A1 * | 6/2010 | Lee | 349/46 |
| 2011/0051055 A1 * | 3/2011 | Lee et al. | 349/106 |

FOREIGN PATENT DOCUMENTS

JP          2007-79525          3/2007

* cited by examiner

*Primary Examiner* — Bumsuk Won
*Assistant Examiner* — Edmond Lau
(74) *Attorney, Agent, or Firm* — K&L Gates LLP

(57) ABSTRACT

A liquid crystal display includes a plurality of pixels including a plurality of displaying subpixels corresponding to various colors and a viewing angle controlling subpixel for controlling a viewing angle, and a common electrode and a retention capacitor respectively provided to the plurality of pixels. At least one of the common electrode and the retention capacitor is provided so that the plurality of displaying subpixels and the viewing angle controlling subpixel are electrically independent from each other in a region where each of the plurality of pixels is provided.

7 Claims, 11 Drawing Sheets

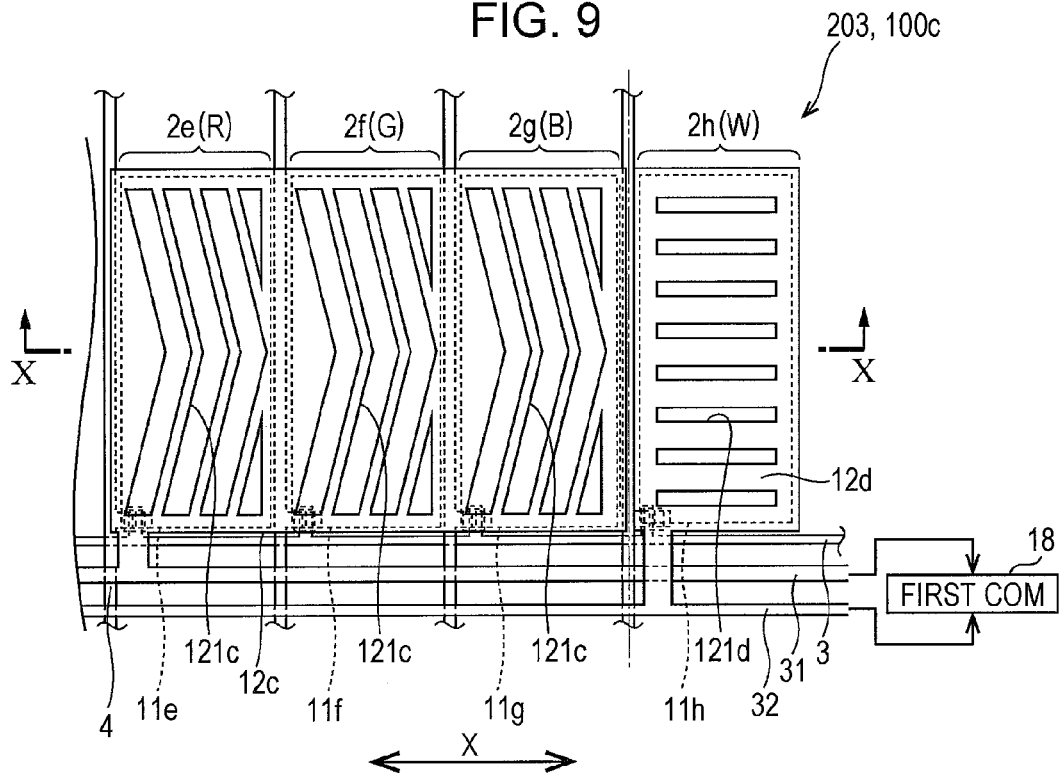
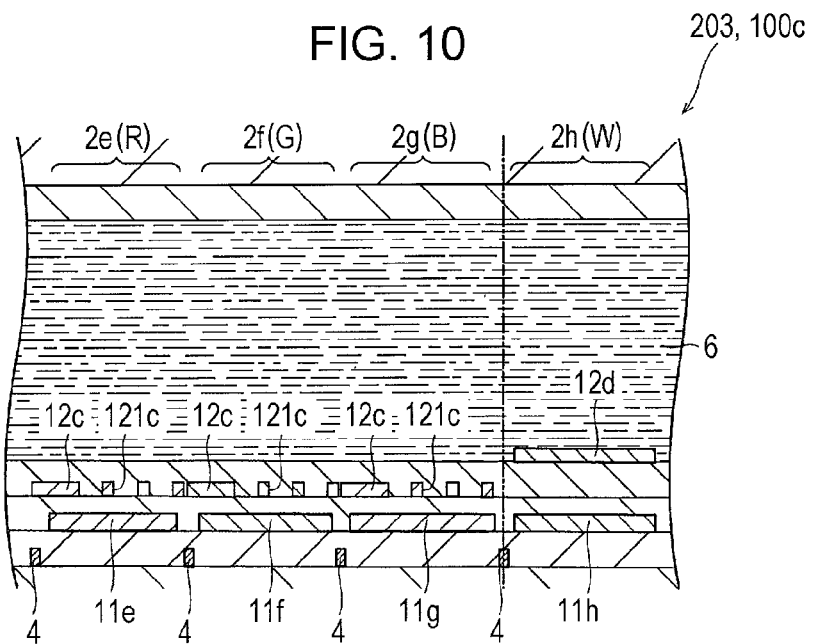

LIQUID CRYSTAL DISPLAY AND ELECTRONIC DEVICE

CROSS REFERENCE TO RELATED APPLICATIONS

The present disclosure contains subject matter related to that disclosed in Japanese Priority Patent Application JP 2009-073725 filed in the Japan Patent Office on Mar. 25, 2009, the entire contents of which are hereby incorporated by reference.

BACKGROUND

The present disclosure relates to a liquid crystal display and an electronic device, more particularly, to a liquid crystal display and an electronic device which has a plurality of pixels including a plurality of displaying subpixels and a viewing angle controlling subpixel.

A liquid crystal display having a plurality of displaying subpixels and a viewing angle controlling subpixel is already disclosed (for example, Japanese Unexamined Patent Application Publication No. 2007-79525).

Japanese Unexamined Patent Application Publication No. 2007-79525 discloses a liquid crystal display in which each pixel is composed of displaying subpixels, which respectively correspond to displaying red R, green G and blue B, and a viewing angle controlling subpixel W for controlling a viewing angle. In the liquid crystal display disclosed in Japanese Unexamined Patent Application Publication No. 2007-79525, it is considered that a common electrode (a retention capacitor) is installed to the displaying subpixel and the viewing angle controlling subpixel. In addition, in the liquid crystal display, a common electrode (a retention capacitor) is generally installed to cover each pixel, and therefore, even in the liquid crystal display disclosed in Japanese Unexamined Patent Application Publication No. 2007-79525, it is considered that a common electrode is formed commonly at the displaying subpixel and the viewing angle controlling subpixel. In addition, in order to control a viewing angle, the viewing angle controlling subpixel may be operated with a higher potential than the displaying subpixel.

SUMMARY

However, in the liquid crystal display disclosed in Japanese Unexamined Patent Application Publication No. 2007-79525, in a case where the viewing angle controlling subpixel is operated with a higher potential than the displaying subpixel in order to control a viewing angle, when the viewing angle controlling subpixel, which is operated with a high potential, turns on or off, the potential applied to the displaying subpixel fluctuates inappropriately since the common electrode (the retention capacitor) is commonly used for the displaying subpixel and the viewing angle controlling subpixel. For this reason, the display quality is deteriorated.

It is desirable to provide a liquid crystal display and an electronic device which may suppress the deterioration of display quality.

A liquid crystal display according to an embodiment includes a plurality of pixels including a plurality of displaying subpixels corresponding to various colors and a viewing angle controlling subpixel for controlling a viewing angle; and a common electrode and a retention capacitor respectively provided to the plurality of pixels, wherein at least one of the common electrode and the retention capacitor is provided so that the plurality of displaying subpixels and the viewing angle controlling subpixel are electrically independent from each other in a region where each of the plurality of pixels is provided.

In the liquid crystal display according to the embodiment, in the region where each of the plurality of pixels is provided, at least one of the common electrodes and the retention capacitors is provided to the plurality of displaying subpixels and the viewing angle controlling subpixel to be electrically independent from each other, so that the displaying subpixels and the viewing angle controlling subpixel are electrically independent in the region where the pixel is provided, unlike the case where both of the common electrode and the retention capacitor provided to the plurality of displaying subpixels and the common electrode and the retention capacitor provided to the viewing angle controlling subpixel are electrically connected to each other in the region where the pixel is provided. Therefore, the displaying subpixels and the viewing angle controlling subpixel do not easily have any electric influence on each other. By doing so, it is possible to suppress the fluctuation of the potential applied to at least one of the common electrode and the retention capacitors provided to the displaying subpixels and applied to at least one of the common electrode and the retention capacitor provided to the viewing angle controlling subpixel, and therefore it is possible to suppress the deterioration of display quality.

The liquid crystal display according to the embodiment preferably further includes a common electrode line electrically connected to the common electrodes and a retention capacitor line electrically connected to the retention capacitors, and in the region where each of the plurality of pixels is provided, the common electrodes and the retention capacitors are respectively connected to the common electrode line and the retention capacitor line so that at least one of the common electrodes and the retention capacitors is provided so that the plurality of displaying subpixels and the viewing angle controlling subpixel are electrically independent from each other. By doing so, the fluctuation of the potential applied to at least one of the common electrode connected to the common electrode line and the retention capacitor connected to the retention capacitor line for the plurality of displaying subpixels and applied to at least one of the common electrode connected to the common electrode line and the retention capacitor connected to the retention capacitor line for the viewing angle controlling subpixel may be suppressed, and therefore it is possible to suppress the deterioration of display quality.

In this case, preferably, the common electrode includes a first common electrode disposed at the plurality of displaying subpixels and a second common electrode electrically independent from the first common electrode and disposed at the viewing angle controlling subpixel, and the common electrode line includes a first common electrode line connected to the first common electrode and a second common electrode line connected to the second common electrode and electrically independent from the first common electrode line at least in the region where each of the plurality of pixels is provided. By doing so, at least in the region where each of the plurality of pixels is provided, the first common electrode and the second common electrode may be provided to be electrically independent from each other, and the first common electrode line connected to the first common electrode and the second common electrode line connected to the second common electrode may be provided to be electrically independent from each other.

In the liquid crystal display having the common electrode which includes the first common electrode and the second common electrode, preferably, the single first common electrode is commonly provided to the plurality of displaying subpixels, the single second common electrode is provided to the viewing angle controlling subpixel, the single first common electrode commonly formed at the plurality of displaying subpixels is connected to the single first common electrode line, and the single second common electrode formed at the viewing angle controlling subpixel is connected to the single second common electrode line. By doing so, at least in the region where each of the plurality of pixels is provided, the first common electrode and the single second common electrode may be provided to be electrically independent from each other, and also the single first common electrode line connected to the first common electrode and the single second common electrode line connected to the single second common electrode may be provided to be electrically independent from each other.

In the liquid crystal display having the common electrode line and the retention capacitor line, preferably, the retention capacitor includes a first retention capacitor disposed at the plurality of displaying subpixels and a second retention capacitor electrically independent from the first retention capacitor and disposed at the viewing angle controlling subpixel, and the retention capacitor line includes a first retention capacitor line connected to the first retention capacitor and a second retention capacitor line connected to the second retention capacitor and electrically independent from the first retention capacitor line at least in the region where each of the plurality of pixels is provided. By doing so, at least in the region where each of the plurality of pixels is provided, the first retention capacitor and the second retention capacitor may be provided to be electrically independent from each other, and also the first retention capacitor line connected to the first retention capacitor and the second retention capacitor line connected to the second retention capacitor may be provided to be electrically independent from each other.

In this case, preferably, the first retention capacitor is respectively provided to each of the plurality of displaying subpixels, the single second retention capacitor is provided to the viewing angle controlling subpixel, the plurality of first retention capacitors formed at the plurality of displaying subpixels are connected to the single first retention capacitor line, and the single second retention capacitor formed at the viewing angle controlling subpixel is connected to the single second retention capacitor line. By doing so, at least in the region where each of the plurality of pixels is provided, the first retention capacitor and the second retention capacitor may be provided to be electrically independent from each other, and also the single first retention capacitor line connected to the first retention capacitor and the single second retention capacitor line connected to the single second retention capacitor may be provided to be electrically independent from each other.

The liquid crystal display according to the first embodiment preferably further includes a first substrate; a pixel transistor formed on the surface of the first substrate; a pixel electrode electrically connected to the pixel transistor; and a second substrate provided to face the first substrate with a liquid crystal layer being interposed between the first and second substrates, wherein the common electrode is formed on a surface of the second substrate at a side of the liquid crystal layer, wherein the plurality of displaying subpixels and the viewing angle controlling subpixel are configured to be operated by a vertical electric field generated between the pixel electrode and the common electrode, and wherein, in the region where each of the plurality of pixels is provided, at least one of the common electrode and the retention capacitor is provided so that the plurality of displaying subpixels and the viewing angle controlling subpixel are electrically independent from each other. By doing so, in the plurality of displaying subpixels and the viewing angle controlling subpixel in the vertical electric field system, it is possible to suppress the deterioration of display quality due to the fluctuation of the potential of at least one of the common electrode and the retention capacitor.

The liquid crystal display according to the first embodiment preferably further includes a third substrate; a pixel transistor formed on the surface of the third substrate; and a pixel electrode provided to the third substrate and electrically connected to the pixel transistor, wherein the common electrode is formed on the surface of the pixel electrode of the third substrate by an insulation film, wherein the plurality of displaying subpixels and the viewing angle controlling subpixel are configured to be operated by a lateral electric field generated between the pixel electrode and the common electrode in each of the plurality of pixels, and wherein, in the region where each of the plurality of pixels is provided, at least one of the common electrode and the retention capacitor is provided so that the plurality of displaying subpixels and the viewing angle controlling subpixel are electrically independent from each other. By doing so, in the plurality of displaying subpixels and the viewing angle controlling subpixel in the lateral electric field system, it is possible to suppress the deterioration of display quality due to the fluctuation of the potential of at least one of the common electrode and the retention capacitor.

The liquid crystal display according to the first embodiment preferably further includes a pixel electrode respectively provided to the plurality of displaying subpixels and the viewing angle controlling subpixel, wherein the plurality of displaying subpixels are configured to be operated by a lateral electric field generated between the pixel electrode and the common electrode in each of the plurality of pixels, wherein the viewing angle controlling subpixel is configured to be operated by a vertical electric field generated between the pixel electrode and the common electrode in each of the plurality of pixels, and wherein, in the region where each of the plurality of pixels is provided, at least one of the common electrode and the retention capacitor is provided so that the plurality of displaying subpixels and the viewing angle controlling subpixel are electrically independent from each other. By doing so, in the plurality of displaying subpixels in the lateral electric field system and the viewing angle controlling subpixel in the vertical electric field system, it is possible to suppress the deterioration of display quality due to the fluctuation of the potential of at least one of the common electrode and the retention capacitor.

The liquid crystal display according to the first embodiment preferably further includes a potential supplying unit which applies a common potential to the common electrode provided to the plurality of displaying subpixels and the common electrode provided to the viewing angle controlling subpixel. By doing so, the common potential may be easily applied to the common electrode provided to the plurality of displaying subpixels and the common electrode provided to the viewing angle controlling subpixel by means of the potential supplying unit.

In this case, preferably, the potential supplying unit includes a first potential supplying unit which applies a first common potential to the common electrode provided to the plurality of displaying subpixels and a second potential supplying unit which applies a second common potential to the common electrode provided to the viewing angle controlling subpixel. By doing so, the first common potential may be applied to the common electrode provided to the plurality of displaying subpixels by means of the first potential supplying unit, and also the second common potential may be applied to the common electrode provided to the viewing angle controlling subpixel by means of the second potential supplying unit, which enables different common potentials to be applied.

An electronic device according to another embodiment includes the liquid crystal display having some of the above configurations. By doing so, it is possible to provide an electronic device having a liquid crystal display which may suppress the deterioration of display quality.

Additional features and advantages are described herein, and will be apparent from the following Detailed Description and the figures.

BRIEF DESCRIPTION OF THE FIGURES

FIG. 9 is a plan view showing a pixel of a liquid crystal display according to a fourth embodiment;

FIG. 10 is a cross-sectional view showing a pixel, taken along the line X-X of FIG. 9;

DETAILED DESCRIPTION

Hereinafter, embodiments will be described with reference to the drawings.

First Embodiment

First, the configuration of a liquid crystal display 100 according to a first embodiment will be described with reference to FIGS. 1 to 3.

Figure 1:
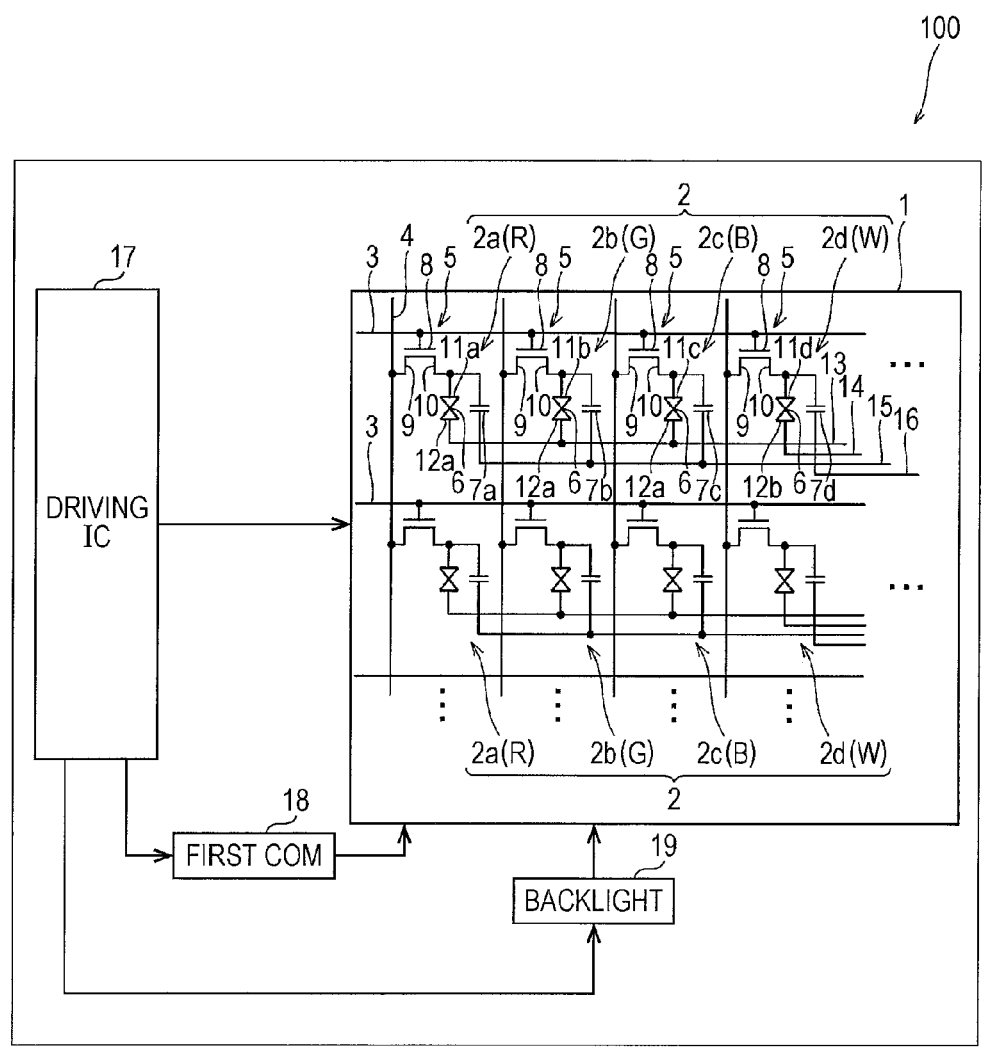
FIG. 1 is a plan view showing a liquid crystal display according to a first embodiment.

In the liquid crystal display 100 according to the first embodiment, as shown in FIG. 1, a plurality of pixels 2 are installed to a display unit 1 in a matrix pattern.

Here, in the first embodiment, the plurality of pixels 2 are composed of four rectangular subpixels including displaying subpixels 2a(R), 2b(G) and 2c(B), which respectively correspond to displaying red R, green G and blue B, and a viewing angle controlling subpixel 2d(W). In addition, the viewing angle controlling subpixel 2d has a function of emitting a transparent or white light in order to control the range of a viewing angle of the image displayed by the display unit 1.

In addition, a plurality of gate lines 3 are installed to the display unit 1, and a plurality of signal lines 4 are installed in a direction orthogonal to the plurality of gate lines 3. The displaying subpixels 2a to 2c and the viewing angle controlling subpixel 2d are arranged in a matrix pattern at cross points of the gate lines 3 and the signal lines 4.

In addition, a pixel transistor 5, a liquid crystal layer 6 and retention capacitors 7a (7b, 7c) and 7d are installed to each of the displaying subpixels 2a (2b, 2c) and the viewing angle controlling subpixel 2d. Moreover, the retention capacitors 7a to 7c are one example of a "first retention capacitor" of the present disclosure, and the retention capacitor 7d is one example of a "second retention capacitor" of the present disclosure. In addition, a gate electrode 8 of the pixel transistor 5 is connected to the gate line 3. A source electrode 9 of the pixel transistor 5 is connected to the signal line 4. A drain electrode 10 of the pixel transistor 5 is connected to pixel electrodes 11a to 11d provided at one side of the liquid crystal layer 6. In addition, common electrodes 12a and 12b are installed to the other side of the liquid crystal layer 6. Moreover, the common electrode 12a is one example of a "first common electrode" of the present disclosure, and the common electrode 12b is one example of a "second common electrode" of the present disclosure.

Figure 2:
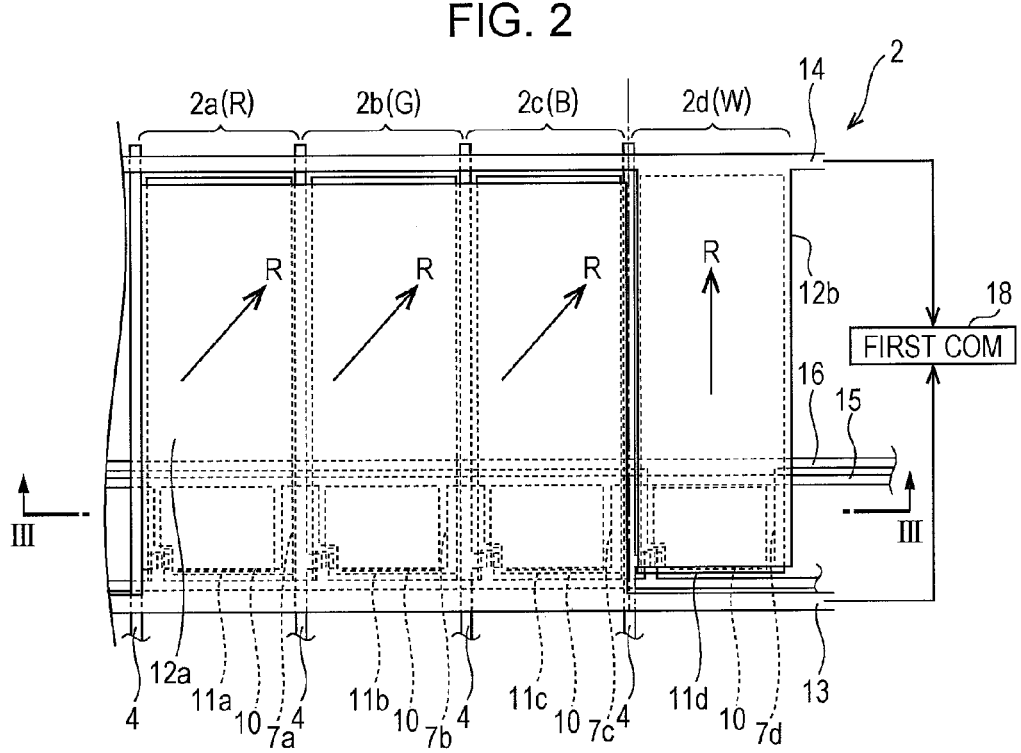
FIG. 2 is a plan view showing a pixel of the liquid crystal display according to the first embodiment.
Figure 3:
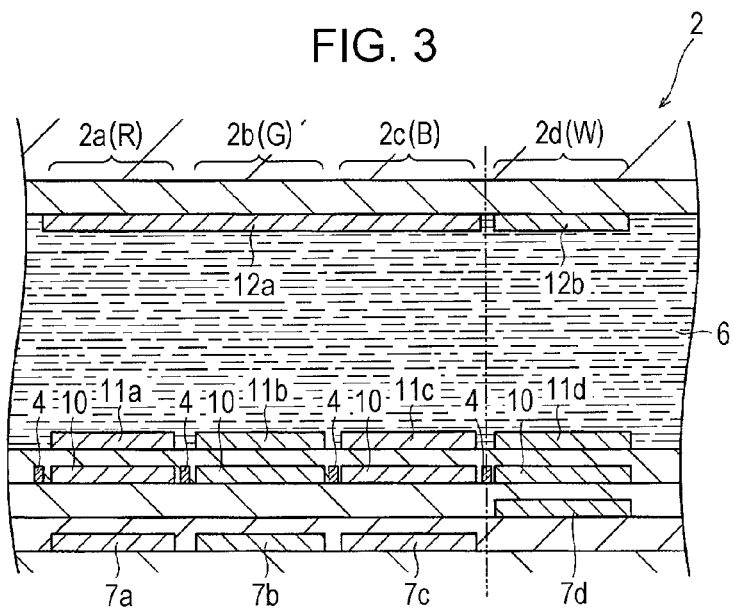
FIG. 3 is a cross-sectional view showing a pixel, taken along the line of FIG. 2.

Here, in the first embodiment, as shown in FIG. 2, in a region where a plurality of pixels 2 are provided, the single common electrode 12a is installed so that the displaying subpixels 2a to 2c and the viewing angle controlling subpixel 2d are electrically independent from each other. In addition, in a region where a plurality of pixels 2 are provided, the common electrode 12a provided to the displaying subpixels 2a to 2c is connected to a single first common electrode line 13. Further, the common electrode 12b provided to the viewing angle controlling subpixel 2d is connected to a single second common electrode line 14. By doing so, as shown in FIG. 3, in the region where the plurality of pixels 2 are provided, the first common electrode line 13 (the common electrode 12a) provided to the displaying subpixels 2a to 2c and the second common electrode line 14 (the common electrode 12b) provided to the viewing angle controlling subpixel 2d are configured to be electrically independent from each other.

In addition, as shown in FIG. 1, the drain electrode 10 of the pixel transistor 5 is respectively electrically connected to one electrode of the retention capacitors 7a to 7d. Moreover, in the first embodiment, as shown in FIG. 2, in the region where the plurality of pixels 2 are provided, the retention capacitors 7a to 7c and the retention capacitor 7d are installed so that the displaying subpixels 2a to 2c and the viewing angle controlling subpixels 2d are electrically independent from each other. In addition, in the region where the plurality of pixels 2 are provided, the retention capacitors 7a to 7c provided to the displaying subpixels 2a to 2c are connected to a single first retention capacitor line 15. Moreover, the retention capacitor 7d provided to the viewing angle controlling subpixel 2d is connected to a single second retention capacitor line 16. By doing so, as shown in FIG. 3, in the region where the plurality of pixels 2 are provided, the first retention capacitor line 15 (the retention capacitors 7a to 7c) provided to the displaying subpixels 2a to 2c and the second retention capacitor line 16 (the retention capacitor 7d) provided to the viewing angle controlling subpixel 2d are configured to be electrically independent from each other. In addition, the first retention capacitor line 15 and the second retention capacitor line 16 are connected to a first COM 18, described later. Moreover, the same potential (equal to or greater than 0 V and equal to or smaller than 5 V) as a potential applied to the first common electrode line 13 and the second common electrode line 14 is applied to the first retention capacitor line 15 and the second retention capacitor line 16.

In addition, as shown in FIG. 1, a driving IC 17 is installed to the liquid crystal display 100 so that a signal is sent from the driving IC 17 to the display unit 1. Moreover, the first COM 18 is installed to the liquid crystal display 100 so that a signal is sent from the driving IC 17 to the first COM 18. The first COM 18 is configured to apply a predetermined common potential (equal to or greater than 0 V and equal to or smaller than 5 V) to the displaying subpixels 2a to 2c and the viewing angle controlling subpixel 2d based on the signal sent from the driving IC 17. In addition, the first COM 18 is one example of a "potential supplying unit" and a "first potential supplying unit" of the present disclosure. In the region of the display unit 1, the first COM 18 is connected to the first common electrode line 13 and the second common electrode line 14. Moreover, a backlight 19 is installed to the liquid crystal display 100 so that a signal is sent thereto from the driving IC 17. The backlight 19 is configured to irradiate light from an opposite side of the display unit 1. In addition, in the first embodiment, a common potential equal to or greater than 0 V and equal to or smaller than 5 V is applied to the first common electrode line 13 and the second common electrode line 14.

Next, the detailed configuration of the pixel 2 will be described with reference to FIG. 4. The gate electrode 8 is formed on a TFT substrate 20. In addition, the TFT substrate 20 is one example of a "first substrate" of the present disclosure. An insulating film 21 made of SiN or the like is formed on the surface of the gate electrode 8. The gate electrode 8 of each subpixel is electrically connected to the corresponding gate line 3 (see FIG. 1). The insulating film 21 has a function of a gate insulating film of the pixel transistor 5. A semiconductor layer 22 made of amorphous silicon (a-Si) is formed on the gate electrode 8 by means of the insulating film 21. The semiconductor layer 22 has a two-layer structure including an a-Si layer which is a lower layer and an n+Si layer having n-type conductivity which is an upper layer. In addition, the n+Si layer which is the upper layer of the semiconductor layer 22 is formed to enhance the transmission efficiency of a carrier.

When seen from the plane, the source electrode 9 and the drain electrode 10 are formed on the surface of the semiconductor layer 22 to overlap the semiconductor layer 22. The source electrode 9 of each subpixel is electrically connected to each corresponding signal line 4 (see FIG. 1). In addition, in the region where the semiconductor layer 22 is interposed between the source electrode 9 and the drain electrode 10, the n+Si layer of the upper layer is removed so that the channel is formed by the a-Si layer which is the lower layer. A passivation film 23 made of SiN is formed on the surfaces of the source electrode 9 and the drain electrode 10. A flattened film 24 made of acrylic resin is formed on the surface of the passivation film 23. The pixel electrodes 11a to 11d are formed on the surface of the flattened film 24 and are electrically connected to the drain electrode 10. An alignment film 41 is formed on the surfaces of the pixel electrodes 11a to 11d. In addition, a potential equal to or greater than 0 V and equal to or smaller than 5 V is applied to the pixel electrodes 11a to 11c provided to the displaying subpixels 2a to 2c. A potential equal to or greater than −10 V and equal to or smaller than 15 V is applied to the pixel electrode 11d provided to the viewing angle controlling subpixel 2d. By doing so, a potential equal to or greater than 0 V and equal to or smaller than 5 V is applied to the region of the liquid crystal region 6 provided to the displaying subpixels 2a to 2c, and a potential equal to or greater than 0 V and equal to or smaller than 15 V is applied to the region of the liquid crystal layer 6 provided to the viewing angle controlling subpixel 2d.

In addition, as shown in FIG. 2, in the alignment film 41, a rubbing process is performed to the displaying subpixels 2a to 2c and the viewing angle controlling subpixel 2d in different directions. By doing so, liquid crystal molecules (the liquid crystal layer 6) are aligned in different directions onto the displaying subpixels 2a to 2c and the viewing angle controlling subpixel 2d.

Figure 4:
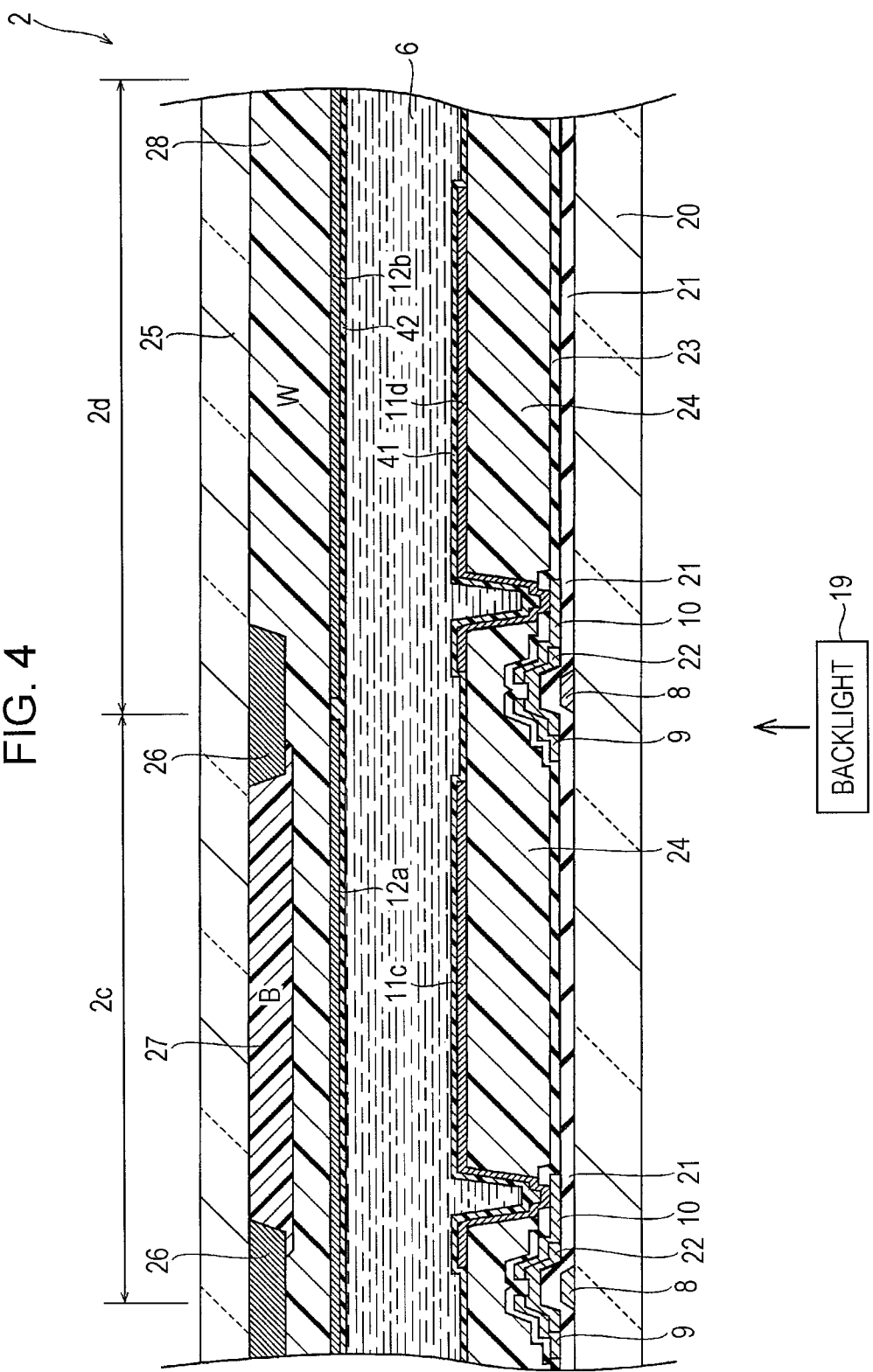
FIG. 4 is a detailed cross-sectional view showing the pixel of the liquid crystal display according to the first embodiment.

In addition, as shown in FIG. 4, an opposite substrate 25 is installed to face the TFT substrate 20 with the liquid crystal layer 6 being interposed therebetween. Moreover, the opposite substrate 25 is one example of a "second substrate" of the present disclosure. A light shielding film (black matrix) 26 is formed on the surface of the opposite substrate 25 at a location corresponding to the region where the pixel transistor 5 on the TFT substrate 20 is provided, and a color filter 27 of each corresponding color (2c (blue: B) in FIG. 4) is formed in a region corresponding to each displaying subpixel 2a to 2c. In addition, in the region corresponding to the viewing angle controlling subpixel 2d, the color filter 27 is not formed, and an overcoat layer 28 is formed on the surfaces of the light shielding film 26 and the color filter 27. An alignment film 42 is installed on the surface of the overcoat layer 28.

In addition, in the first embodiment, the displaying subpixels 2a to 2c and the viewing angle controlling subpixel 2d are configured in an ECB (Electrically Controlled Birefringence) mode which is a vertical electric field system in which a liquid crystal is operated by a vertical electric field generated between the common electrodes 12a and 12b formed at the TFT substrate 20 and the pixel electrodes 11a to 11d.

In this configuration, the viewing angle is not controlled if the viewing angle controlling subpixel 2d is not operated, and the display image displayed on the display unit 1 may be recognized not only in a front direction but also in an inclined direction. Meanwhile, in a case where the viewing angle controlling subpixel 2d is operated, the light emitting from the viewing angle controlling subpixel 2d is overlapped with the light (image) in an inclined direction which emits from each displaying subpixel 2a to 2c so that the contrast of the image deteriorates in the inclined direction. In addition, to the extent that the contrast deteriorates, the display image displayed on the display unit 1 becomes unrecognizable (the viewing angle is controlled) when the display unit 1 is watched in an inclined direction.

In the first embodiment, in the region where each of the plurality of pixels 2 is provided, the common electrodes 12a and 12b and the retention capacitors 7a to 7d are provided to the plurality of displaying subpixels 2a to 2c and the viewing angle controlling subpixel 2d to be electrically independent from each other, so that the displaying subpixels 2a to 2c and the viewing angle controlling subpixel 2d are electrically independent in the region where the pixel is provided, and therefore the displaying subpixels 2a to 2c and the viewing angle controlling subpixel 2d do not easily have any electric influence on each other. By doing so, it is possible to suppress the fluctuation of the potential applied to the common electrode 12a and the retention capacitors 7a to 7c provided to the displaying subpixels 2a to 2c and the common electrode 12b and the retention capacitor 7d provided to the viewing angle controlling subpixel 2d, and therefore it is possible to suppress the deterioration of display quality.

In addition, in the first embodiment, as described above, in the region where each of the plurality of pixels 2 is provided, the common electrode 12a is connected to the common electrode line 13, and the common electrode 12b is connected to the common electrode line 14. In addition, the retention capacitors 7a to 7c are connected to the retention capacitor line 15, and the retention capacitor 7d is connected to the retention capacitor line 16. Due to the connection to the common electrode lines 13 and 14 and the retention capacitor lines 15 and 16 which ensures that the displaying subpixels 2a to 2c and the viewing angle controlling subpixel 2d are electrically independent from each other, it is possible to prevent the potential applied to the common electrode 12a connected to the common electrode line 13 of the displaying subpixels 2a to 2c and the common electrode 12b connected to the common electrode line 14 of the viewing angle controlling subpixel 2d from fluctuating, and therefore it is possible to suppress the deterioration of display quality.

In addition, in the first embodiment, as described above, the single common electrode 12a commonly formed at the plurality of displaying subpixels 2a to 2c is connected to the single first common electrode line 13, and the single common electrode 12b formed at the viewing angle controlling subpixel 2d is connected to the single second common electrode line 14 so that, at least in the region where each of the plurality of pixels 2 is provided, the common electrode 12a and the single common electrode 12b are provided to be electrically independent from each other, and so that the single first common electrode line 13 connected to the common electrode 12a is provided to the single second common electrode line 14 connected to the single common electrode 12b to be electrically independent from each other.

In addition, in the first embodiment, as described above, the plurality of retention capacitors 7a to 7c formed at the plurality of displaying subpixels 2a to 2c are connected to the single first retention capacitor line 15, and the retention capacitor 7d formed at the viewing angle controlling subpixel 2d is connected to the single second retention capacitor line 16 so that, at least in the region where each of the plurality of pixels 2 is provided, the retention capacitors 7a to 7c and the single retention capacitor 7d are provided to be electrically independent from each other, and so that the single first retention capacitor line 15 connected to the retention capacitors 7a to 7c is provided with the single second retention capacitor line 16 connected to the single retention capacitor 7d to be electrically independent from each other.

In addition, in the first embodiment, as described above, the plurality of displaying subpixels 2a to 2c and the viewing angle controlling subpixel 2d are operated by the vertical electric field generated between the pixel electrodes 11a to 11d and the common electrodes 12a and 12b so that, in the region where each of the plurality of pixels 2 is provided, the common electrodes 12a and 12b and the retention capacitors 7a to 7d are provided to the plurality of displaying subpixels 2a to 2c and the viewing angle controlling subpixel 2d to be electrically independent from each other. Therefore, in the displaying subpixels 2a to 2c and the viewing angle controlling subpixel 2d, the deterioration of display quality caused by the fluctuation of the potential with any one of the common electrodes 12a and 12b and the retention capacitors 7a to 7d may be suppressed.

In addition, in the first embodiment, as described above, the first COM 18 is provided so that the common potential may be easily applied to the common electrode 12a provided to the plurality of displaying subpixels 2a to 2c and the common electrode 12b provided to the viewing angle controlling subpixel 2d by the first COM 18.

Second Embodiment

Next, the second embodiment will be described with reference to FIGS. 5 and 6. The second embodiment illustrates an example in which the displaying subpixels 2a to 2c and the viewing angle controlling subpixel 2d are configured to be electrically independent from each other only for the retention capacitors, unlike the first embodiment showing the example in which the displaying subpixels 2a to 2c and the viewing angle controlling subpixel 2d are provided to be electrically independent from each other for both of the common electrodes and the retention capacitors.

Figure 5:
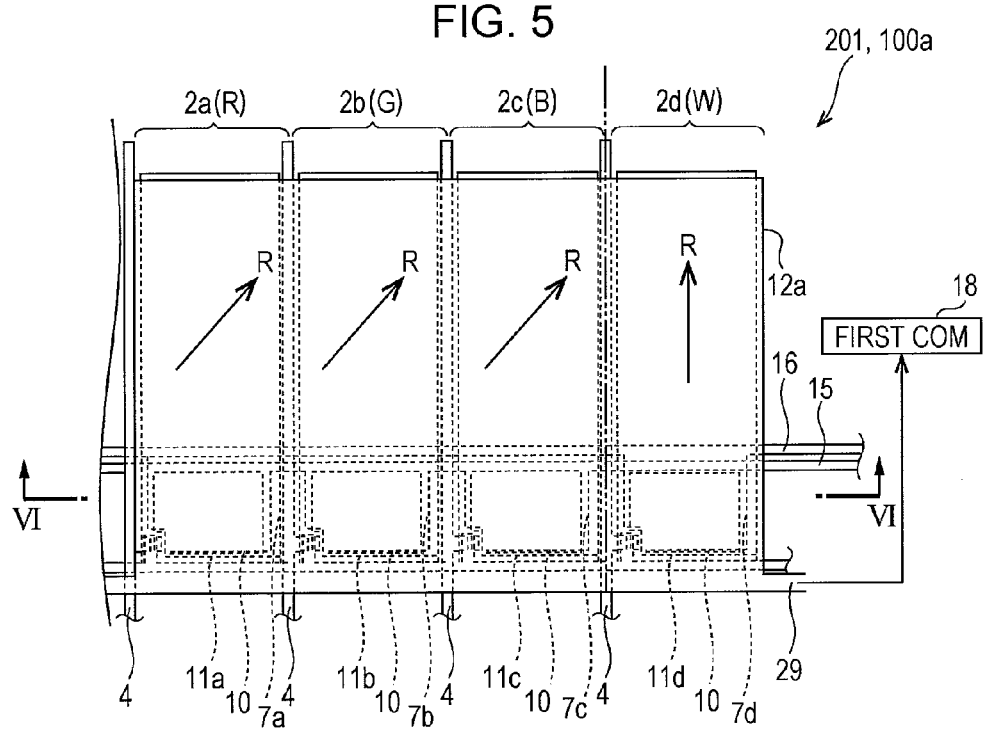
FIG. 5 is a plan view showing a pixel of a liquid crystal display according to a second embodiment.
Figure 6:
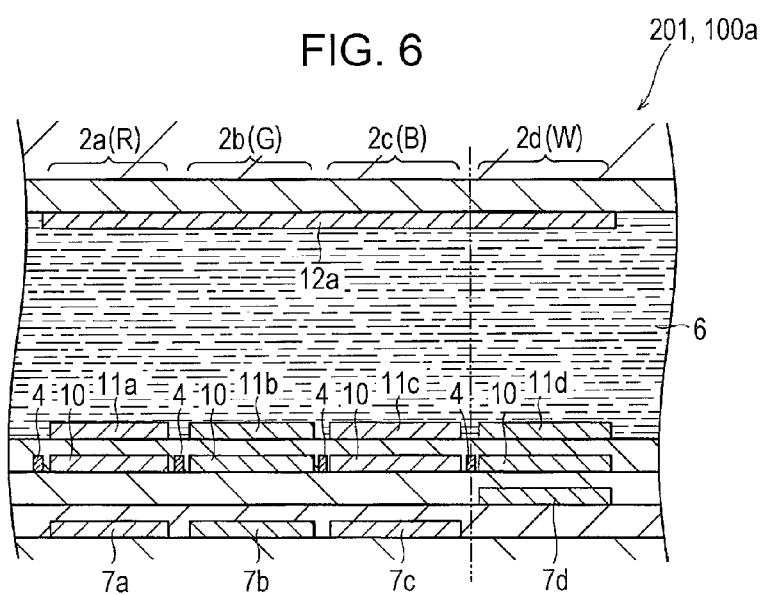
FIG. 6 is a cross-sectional view showing a pixel, taken along the line VI-VI of FIG. 5.

In the liquid crystal display 100a of the second embodiment, as shown in FIGS. 5 and 6, the common electrode 12a provided to the displaying subpixels 2a to 2c of a plurality of pixels 201 and the common electrode 12b provided to the viewing angle controlling subpixel 2d are electrically connected to a single first common electrode line 29. The first common electrode line 29 is connected to the first COM 18, and a common potential equal to or greater than 0 V and equal to or smaller than 5 V is applied thereto.

In addition, in the second embodiment, the retention capacitors 7a to 7c provided to the displaying subpixels 2a to 2c and the retention capacitor 7d provided to the viewing angle controlling subpixel 2d are respectively connected to the first retention capacitor line 15 and the second retention capacitor line 16 to be electrically independent from each other so that the retention capacitors 7a to 7c and the retention capacitor 7d are electrically independent from each other. In addition, the first retention capacitor line 15 and the second retention capacitor line 16 are connected to the first COM 18 or the like. Moreover, the same potential (equal to or greater than 0 V and equal to or smaller than 5 V) as the potential applied to the first common electrode line 13 and the second common electrode line 14 is applied to the first retention capacitor line 15 and the second retention capacitor line 16.

In addition, other configurations of the second embodiment are identical to those of the first embodiment.

In the second embodiment, as described above, in the region where each of the pixels 2 is provided, the retention capacitors 7a to 7d are provided to the displaying subpixels 2a to 2c and the viewing angle controlling subpixel 2d to be electrically independent from each other so that the displaying subpixels 2a to 2c are electrically independent from the viewing angle controlling subpixel 2d in the region where the pixel 2 is provided, unlike the case in which the retention capacitors 7a to 7c provided to the displaying subpixels 2a to 2c are electrically connected to the retention capacitor 7d provided to the viewing angle controlling subpixel 2d in the region where the pixel 2 is provided. Therefore, the displaying subpixels 2a to 2c and the viewing angle controlling subpixel 2d do not easily have any electric influence on each other, which prevents the display quality from deteriorating.

In addition, other effects of the second embodiment are identical to those of the first embodiment.

Third Embodiment

Next, the third embodiment will be described with reference to FIGS. 7 and 8. In the third embodiment, unlike the first embodiment showing the example in which the displaying subpixels 2a to 2c and the viewing angle controlling subpixel 2d are provided to be electrically independent from each other for both of the common electrodes and the retention capacitors, the third embodiment illustrates an example in which the displaying subpixels 2a to 2c and the viewing angle controlling subpixel 2d are configured to be electrically independent from each other only for the common electrodes.

Figure 7:
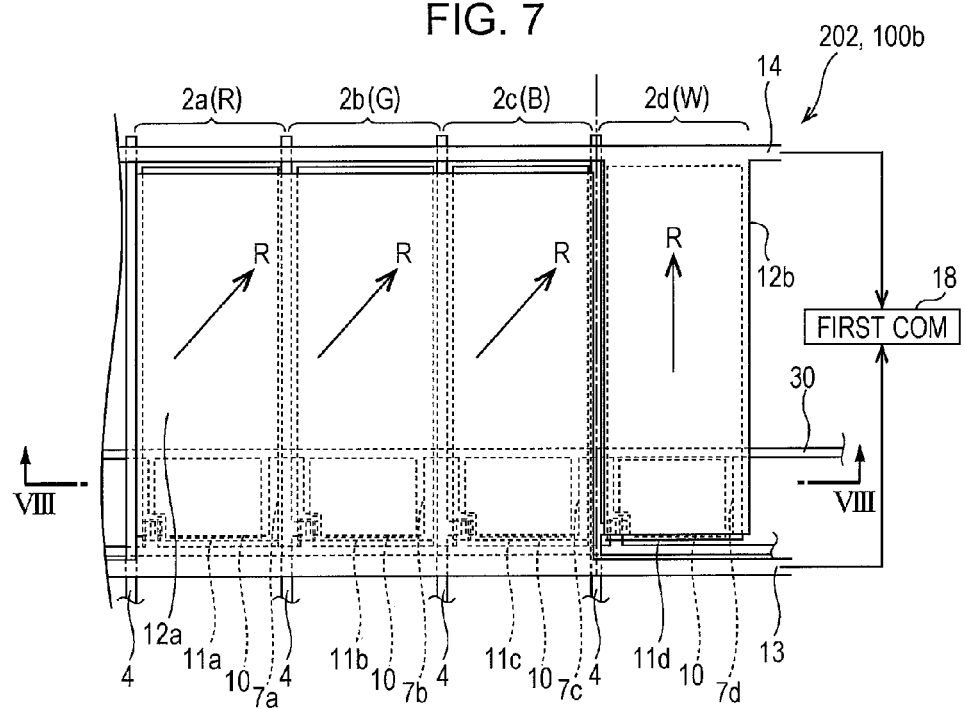
FIG. 7 is a plan view showing a pixel of a liquid crystal display according to a third embodiment.

In the liquid crystal display 100b of the third embodiment, as shown in FIG. 7, in the region in which each of the plurality of pixels 202 is provided, the common electrode 12a provided to the displaying subpixels 2a to 2c of a plurality of pixels 202 and the common electrode 12b provided to the viewing angle controlling subpixel 2d are electrically connected to the first common electrode line 13 and the second common electrode line 14 to be electrically independent from each other. The first common electrode line 13 and the second common electrode line 14 are connected to the first COM 18. In addition, a common potential equal to or greater than 0 V and equal to or smaller than 5 V is applied to the first common electrode line 13 and the second common electrode line 14.

Figure 8:
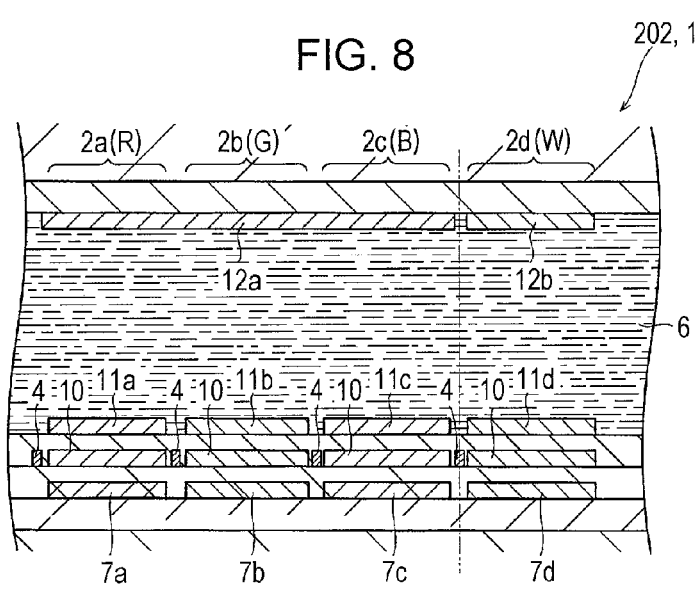
FIG. 8 is a cross-sectional view showing a pixel, taken along the line VIII-VIII of FIG. 6.

By doing so, as shown in FIG. 8, in the region where each of the plurality of pixels 202 is provided, the first common electrode line 13 (the common electrode 12a) provided to the displaying subpixels 2a to 2c and the second common electrode line 14 (the common electrode 12b) provided to the viewing angle controlling subpixel 2d are configured to be electrically independent from each other.

In addition, in the third embodiment, as shown in FIG. 7, the retention capacitors 7a to 7c provided to the displaying subpixels 2a to 2c and the retention capacitor 7d provided to the viewing angle controlling subpixel 2d are electrically connected to a single first retention capacitor line 30.

By doing so, as shown in FIG. 8, in the region where each of the plurality of pixels 202 is provided, the retention capacitors 7a to 7c provided to the displaying subpixels 2a to 2c and the retention capacitor 7d provided to the viewing angle controlling subpixel 2d are electrically connected to a single first retention capacitor line 30.

In addition, other configurations of the third embodiment are identical to those of the first embodiment.

In the third embodiment, as described above, in the region where each of the plurality of pixels 2 is provided, the common electrodes 12a and 12b are provided to the plurality of displaying subpixels 2a to 2c and the viewing angle controlling subpixel 2d to be electrically independent from each other so that the displaying subpixels 2a to 2c are electrically independent from the viewing angle controlling subpixel 2d in the region where the pixel 2 is provided, unlike the case in which the common electrode 12a provided to the displaying subpixels 2a to 2c is electrically connected to the common electrode 12b provided to the viewing angle controlling subpixel 2d in the region where the pixel 2 is provided. Therefore, the displaying subpixels 2a to 2c and the viewing angle controlling subpixel 2d do not easily have any electric influence on each other, which may prevent the display quality from deteriorating.

In addition, other effects of the third embodiment are identical to those of the first embodiment.

Fourth Embodiment

Next, the fourth embodiment will be described with reference to FIGS. 9 to 11. In the fourth embodiment, unlike the first embodiment showing an example in which the displaying subpixels 2a to 2c and the viewing angle controlling subpixel 2d of a plurality of pixels 2 are operated using the vertical electric field system, an example in which displaying subpixels 2e to 2g and a viewing angle controlling subpixel 2h of a plurality of pixels 2 are operated using a lateral electric field system is described.

Figure 11:
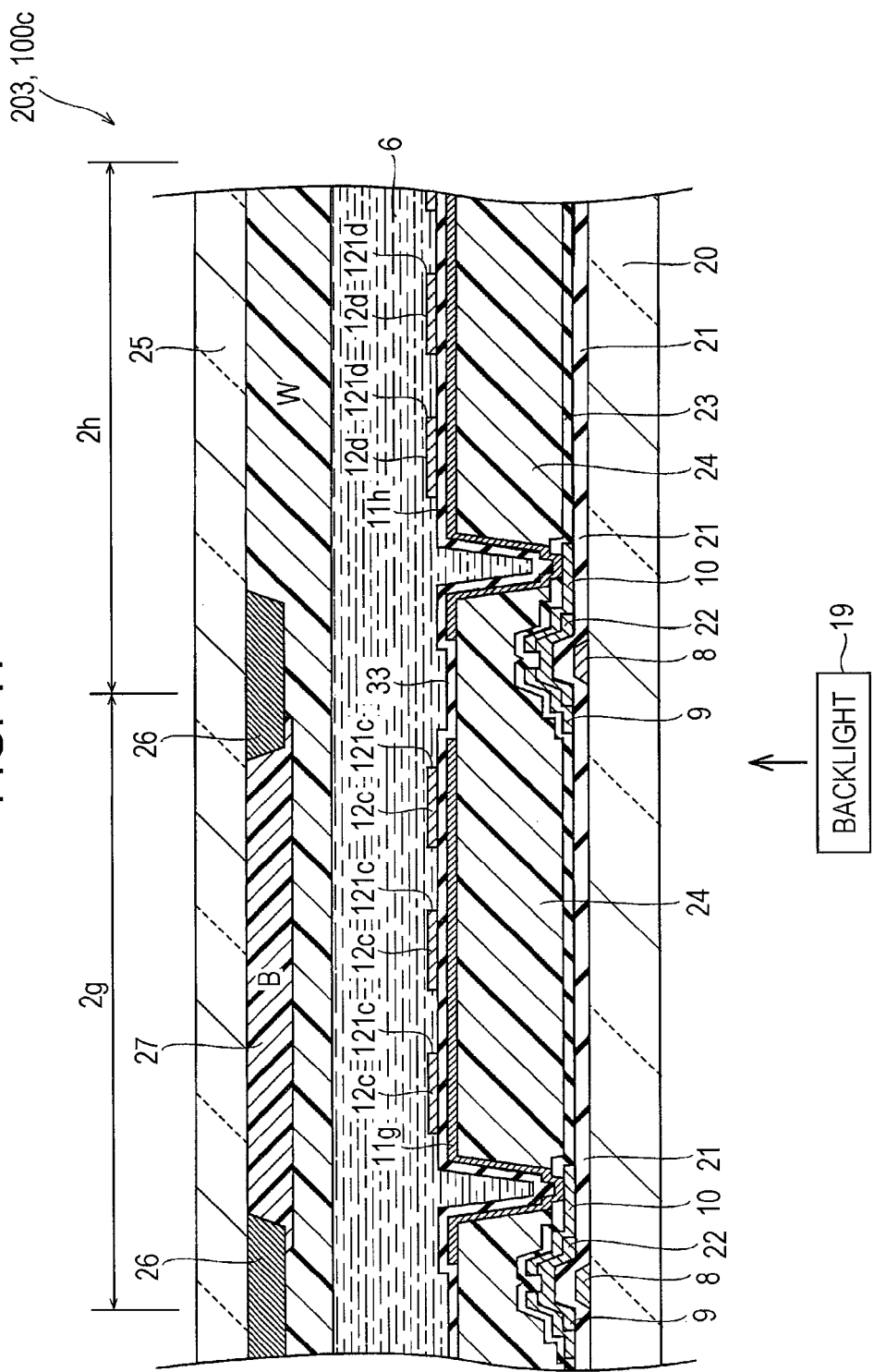
FIG. 11 is a detailed cross-sectional view showing the pixel of the liquid crystal display according to a fourth embodiment.

In the liquid crystal display 100c of the fourth embodiment, as shown in FIG. 11, pixel electrodes 11e to 11h are formed at the displaying subpixels 2e to 2g and the viewing angle controlling subpixel 2h of a plurality of pixels 203. An insulation film 33 is formed on the surface of the pixel electrodes 11e to 11h. Common electrodes 12c and 12d are formed on the surface of the insulation film 33. In addition, the common electrode 12c is one example of a "first common electrode" of the present disclosure, and the common electrode 12d is one example of a "second common electrode" of the present disclosure. By doing so, the liquid crystal is operated by the lateral electric field generated between the common electrodes 12c and 12d formed at the TFT substrate 20 and the pixel electrodes 11e to 11h in a FFS (Fringe Field Switching) mode of the lateral electric field system. In addition, the TFT substrate 20 is one example of a "third substrate" of the present disclosure.

In addition, as shown in FIG. 9, a V-shaped slit 121c is formed in the common electrode 12c provided to the displaying subpixels 2e, 2f and 2g when seen from the plane. In addition, a rectangular-shaped slit 121d extending in an X direction is formed in the common electrode 12d provided to the viewing angle controlling subpixel 2h, when seen from the plane.

In addition, in the fourth embodiment, the common electrode 12c provided to the displaying subpixels 2e to 2g is connected to a single first common electrode line 31. Moreover, the common electrode 12d provided to the viewing angle controlling subpixel 2h is connected to a single second common electrode line 32.

By doing so, as shown in FIG. 10, in the region where each of the plurality of pixels 203 is provided, the first common electrode line 31 (the common electrode 12c) provided to the displaying subpixels 2e to 2g and the second common electrode line 32 (the common electrode 12d) provided to the viewing angle controlling subpixel 2h are provided to be electrically independent from each other.

In addition, a common potential equal to or greater than 0 V or equal to or smaller than 5 V is applied to the first common electrode line 31 and the second common electrode line 32. Moreover, in a case where the displaying subpixels 2e to 2g and the viewing angle controlling subpixel 2h are configured in the lateral electric field system, the retention capacitor is formed between the pixel electrode 11e (11f, 11g, 11h) and the common electrode 12c (12d).

In addition, other configurations of the fourth embodiment are identical to those of the first embodiment.

In the fourth embodiment, as described above, in each of the plurality of pixels 203, the plurality of displaying subpixels 2e to 2g and the viewing angle controlling subpixel 2h are operated by the lateral electric field generated between the pixel electrodes 11e to 11h and the common electrodes 12c and 12d so that the common electrodes 12c and 12d are provided to the displaying subpixels 2e to 2g and the viewing angle controlling subpixel 2h to be electrically independent from each other in the region where each of the plurality of pixels 203 is provided. Therefore, in the displaying subpixels 2e to 2g and the viewing angle controlling subpixel 2h, it is possible to prevent the display quality from deteriorating due to the fluctuation of the potential of the common electrodes 12c and 12d.

In addition, other effects of the fourth embodiment are identical to those of the first embodiment.

Fifth Embodiment

Next, the fifth embodiment will be described with reference to FIGS. 12 to 15. In the fifth embodiment, unlike the fourth embodiment showing the example in which the viewing angle controlling subpixel 2h of the plurality of pixels 203 is operated in the lateral electric field system, an example in which the viewing angle controlling subpixel 2d of a plurality of pixels 204 is operated in a vertical electric field will be described.

Figure 12:
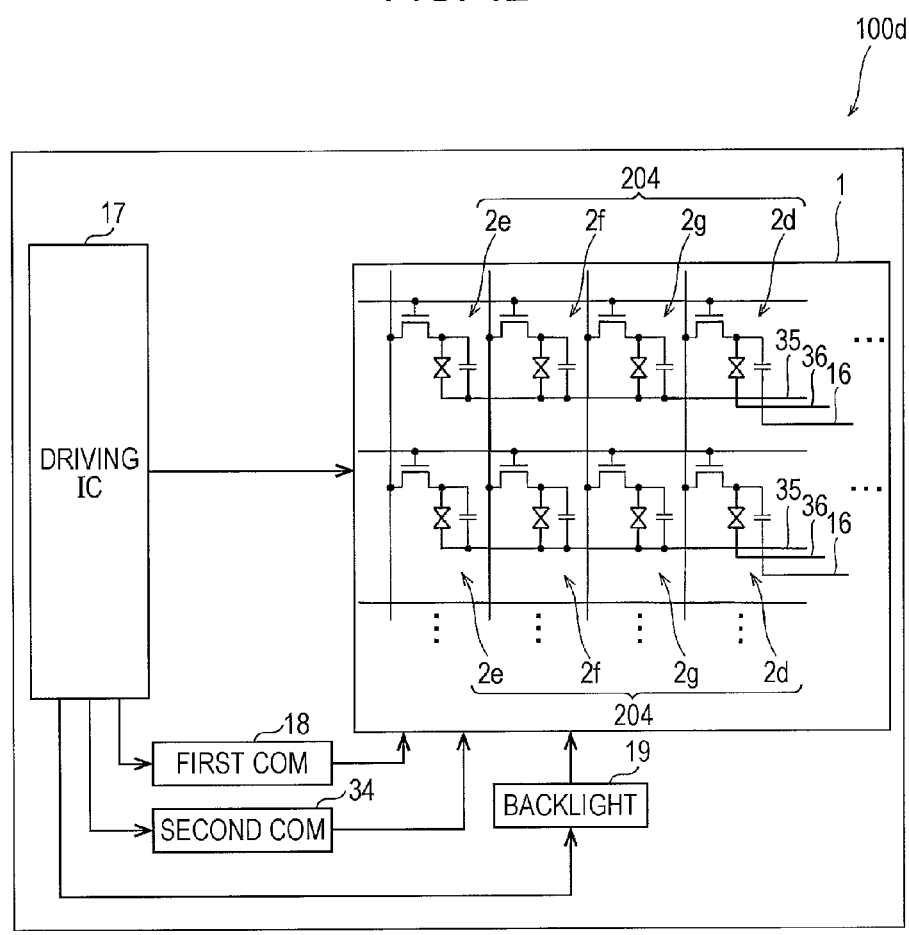
FIG. 12 is a plan view showing a liquid crystal display according to a fifth embodiment.
Figure 15:
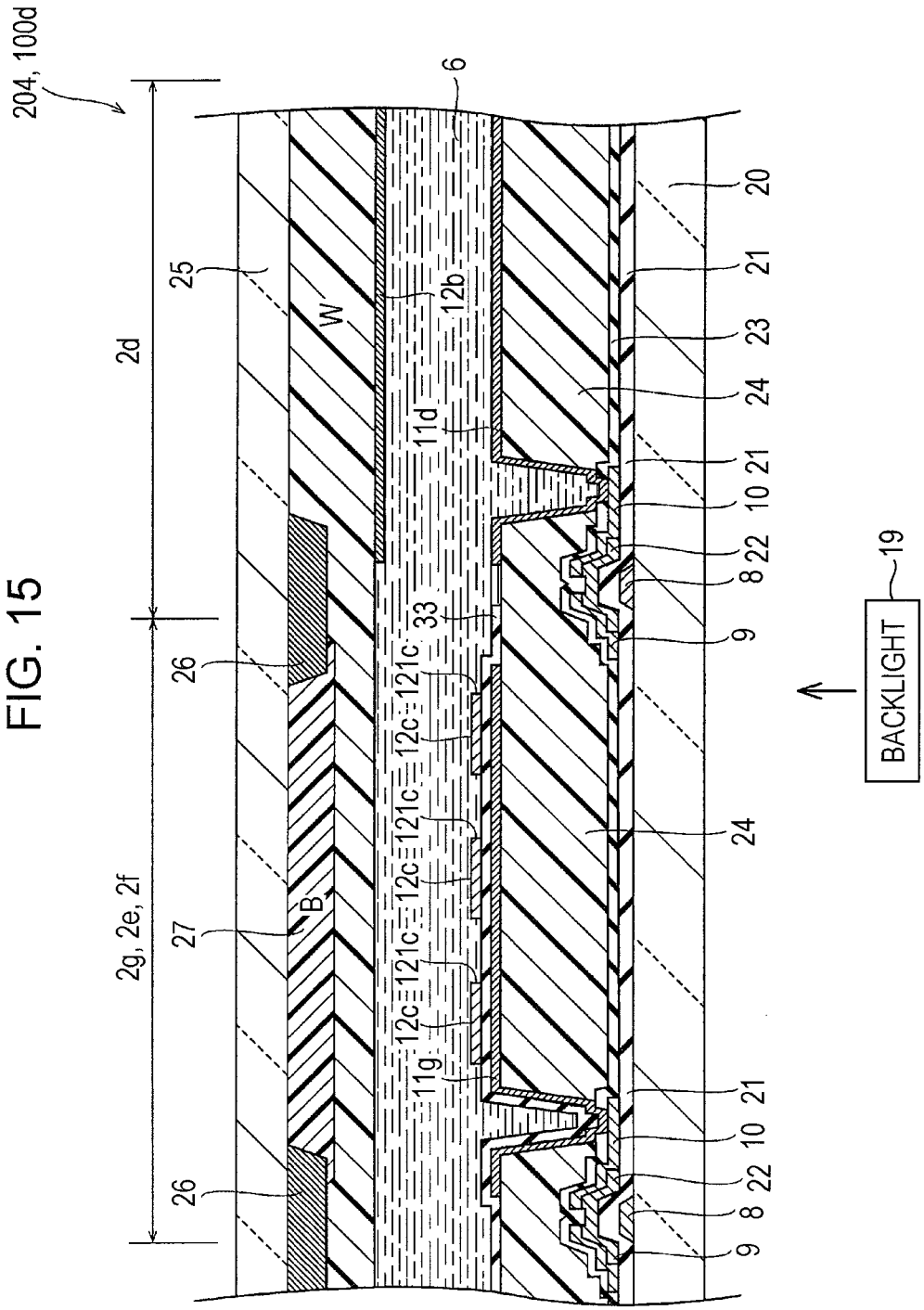
FIG. 15 is a detailed cross-sectional view showing the pixel of the liquid crystal display according to the fifth embodiment.

In the liquid crystal display 100d of the fifth embodiment, as shown in FIG. 12, a second COM 34 is installed to the liquid crystal display 100d. A signal is provided from the driving IC 17 to the second COM 34. In addition, the second COM 34 is one example of a "second potential supplying unit" of the present disclosure. The second COM 34 is configured to apply a common potential to the viewing angle controlling subpixel 2d of the display unit 1, which is unlike the first COM 18. In addition, as shown in FIG. 15, the displaying subpixels 2e to 2g of the plurality of pixels 204 are operated in the lateral electric field system, while the viewing angle controlling subpixel 2d is operated using the vertical electric field system.

Figure 13:
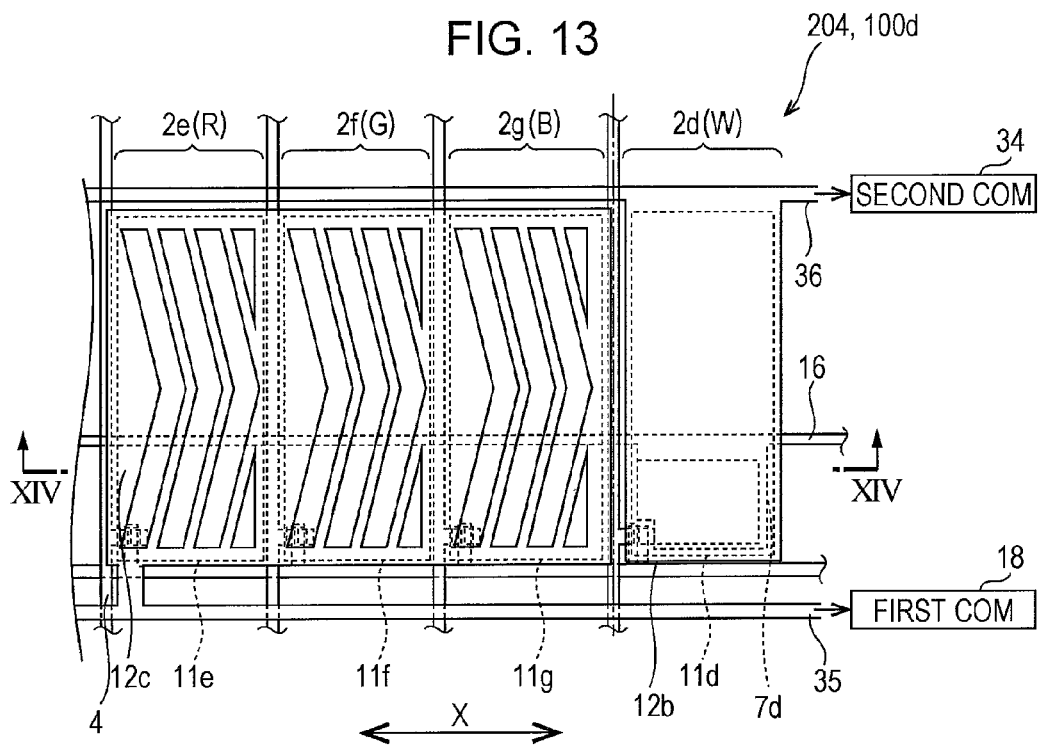
FIG. 13 is a plan view showing a pixel of the liquid crystal display according to the fifth embodiment.

In addition, in the fifth embodiment, as shown in FIG. 13, the common electrode 12c provided to the displaying subpixels 2e to 2g is electrically connected to a single first common electrode line 35. The first common electrode line 35 is electrically connected to the first COM 18. In addition, the common electrode 12b provided to the viewing angle controlling subpixel 2d is connected to a single second common electrode line 36. The second common electrode line 36 is electrically connected to the second COM 34.

Figure 14:
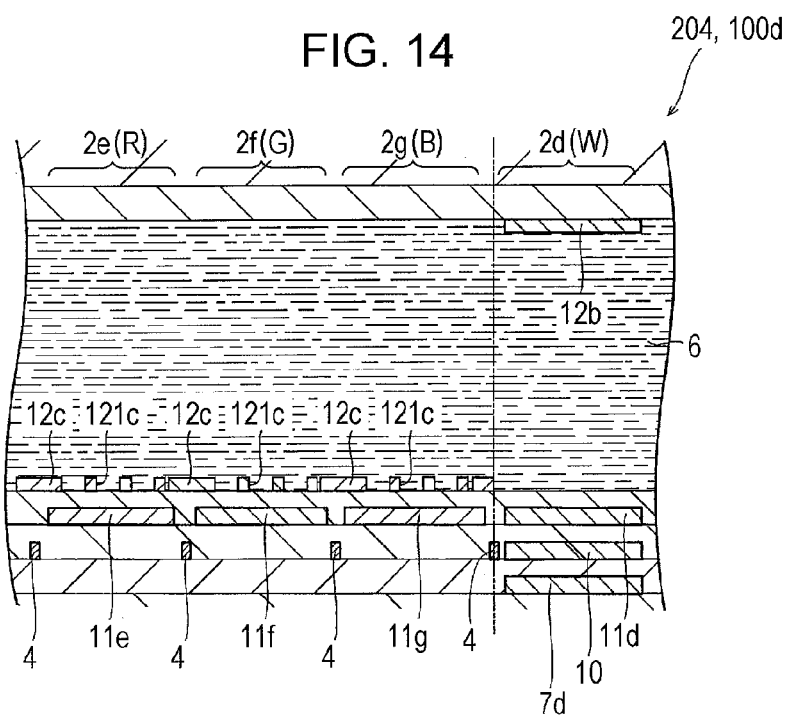
FIG. 14 is a cross-sectional view showing a pixel, taken along the line XIV-XIV of FIG. 13.

By doing so, as shown in FIG. 14, the first common electrode line 35 (the common electrode 12c) provided to the displaying subpixels 2e to 2g and the second common electrode line 36 (the common electrode 12b) provided to the viewing angle controlling subpixel 2d are configured to be electrically independent from each other. In addition, the retention capacitor 7d provided to the viewing angle controlling subpixel 2d is electrically connected to a single second retention capacitor line 16.

In addition, a common potential (a first common potential) equal to or greater than 0 V and equal to or smaller than 5 V is applied to the first common electrode line 35, and a common potential (a second common potential) equal to or greater than 0 V and equal to or smaller than 5 V is applied to the second common electrode line 36.

In addition, other configurations of the fifth embodiment are identical to those of the fourth embodiment.

In the fifth embodiment, as described above, in each of the plurality of pixels 204, the plurality of displaying subpixels 2e to 2g are configured to be operated by the lateral electric field generated respectively between the pixel electrodes 11e to 11g and the common electrode 12c, and in each of the plurality of pixels 204, the viewing angle controlling subpixel 2d is configured to be operated by the vertical electric field generated between the pixel electrode 11d and the common electrode 12b, so that, in the region where each of the plurality of pixels 204 is provided, the common electrodes 12c and 12b and the retention capacitor 7d are provided to the plurality of displaying subpixels 2e to 2g and the viewing angle controlling subpixel 2d to be electrically independent from each other. By doing so, in the displaying subpixels 2e to 2g using the lateral electric field system and the viewing angle controlling subpixel 2d using the vertical electric field system, it is possible to prevent the display quality from deteriorating due to the fluctuation of the potential of at least one of the common electrodes 12c and 12b and the retention capacitor 7d.

In addition, in the fifth embodiment, as described above, as the potential supplying unit includes the first COM 18 and the second COM 34, a common potential may be securely applied to the common electrode 12c provided to the plurality of displaying subpixels 2e to 2g by means of the first COM 18, and a common potential may also be applied to the common electrode 12b provided to the viewing angle controlling subpixel 2d by means of the second COM 34. Therefore, it is possible to apply different common potentials.

Other effects of the fifth embodiment are identical to those of the fourth embodiment.

Figure 16:
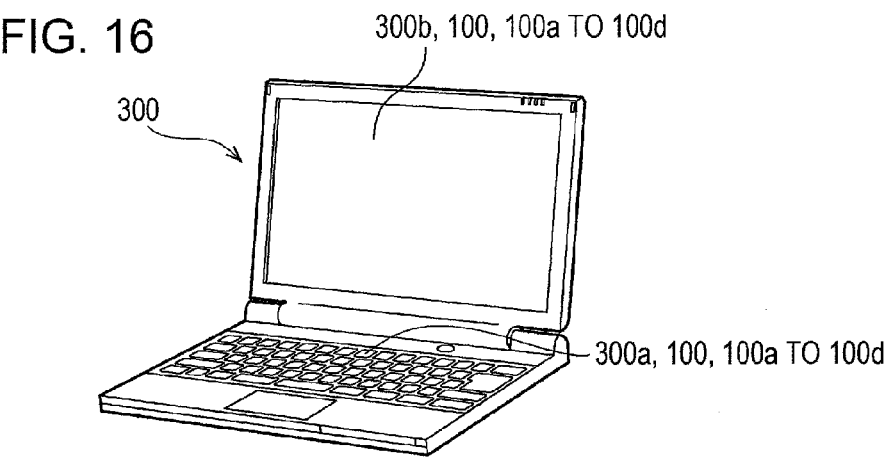
FIG. 16 is a diagram for illustrating a first example of an electronic device using the liquid crystal display according to the first to fifth embodiments.
Figure 17:
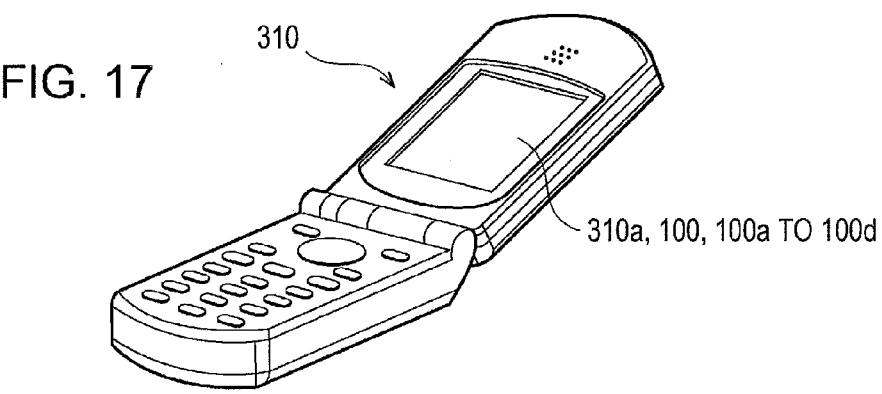
FIG. 17 is a diagram for illustrating a second example of the electronic device using the liquid crystal display according to the first to fifth embodiments.
Figure 18:
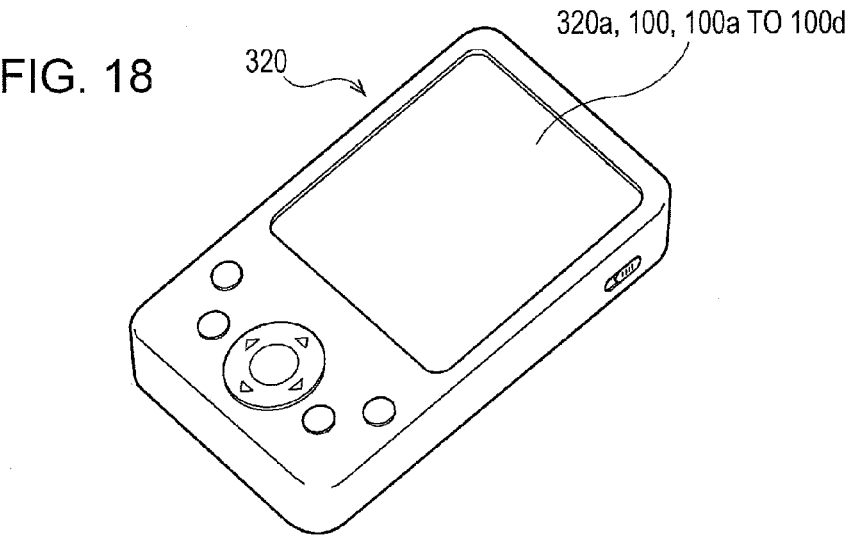
FIG. 18 is a diagram for illustrating a third example of the electronic device using the liquid crystal display according to the first to fifth embodiments.

FIGS. 16 to 18 are diagrams for illustrating first and third examples of an electronic device using the liquid crystal display 100, 100a, 100b, 100c, and 100d according to the first to fifth embodiments, respectively. The electronic device using the liquid crystal display 100, 100a, 100b, 100c, and 100d according to the first to fifth embodiments will be described with reference to FIGS. 16 to 18.

The liquid crystal display 100, 100a, 100b, 100c, and 100d according to the first to fifth embodiments may be used for a PC (Personal Computer) 300 as a first example, for a cellular phone 310 as a second example, and for a portable information terminal (PDA: Personal Digital Assistant) 320 as a third example, as shown in FIGS. 16 to 18. In the PC 300 which is the first example shown in FIG. 16, the liquid crystal display 100, 100a, 100b, 100c, and 100d according to the first to fifth embodiments may be used for an input unit 300a such as a keyboard or a display screen 300b. In the cellular phone 310 which is the second example shown in FIG. 17, the liquid crystal display 100, 100a, 100b, 100c, and 100d according to the first to fifth embodiment may be used for a display screen 310a. In the PDA 320 which is the third example shown in FIG. 18, the liquid crystal display 100, 100a, 100b, 100c, and 100d according to the first to fifth embodiments may be used for a display screen 320a.

Even though it is described in the first to fifth embodiments that the displaying subpixels and the viewing angle controlling subpixel are operated in a vertical electric field system such as ECB or in a lateral electric field system such as FFS, they may also be operated in a vertical electric field system such as TN (Twisted Nematic) or a lateral electric field system such as IPS (In Plane Switching) without being limited thereto.

In addition, even though it is described in the first to fifth embodiments that the plurality of common electrodes provided to the plurality of displaying subpixels is connected to a single common electrode line, it is also possible that one common electrode is connected to one common electrode line without being limited thereto.

Moreover, even though it is described in the first to fifth embodiments that the displaying subpixels are composed of three subpixels of R, G and B, the disclosure is not limited thereto and the number of displaying subpixels may be other than three.

In addition, even though it is described in the fourth embodiment that the common electrode of the viewing angle controlling subpixel is formed at the upper layer of the common electrode of the displaying subpixels, the common electrode of the viewing angle controlling subpixel may also be formed at the lower layer of the common electrode of the displaying subpixels.

In addition, even though it is described in the fourth embodiment that the common electrode is formed through insulation film on the surface of the pixel electrode, the pixel electrode may also be formed through the insulation film on the surface of the common electrode without being limited thereto.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display comprising:
   a plurality of pixels including a plurality of displaying subpixels corresponding to various colors and a viewing angle controlling subpixel for controlling a viewing angle;
   a common electrode and a retention capacitor respectively provided to each of the plurality of pixels;
   a common electrode line electrically connected to the common electrode; and
   a retention capacitor line electrically connected to the retention capacitor,
   the common electrode including a first common electrode commonly formed at the plurality of displaying subpixels and a second common electrode formed at the viewing angle controlling subpixel,
   wherein the common electrode line includes a first common electrode line connected to the first common electrode and a second common electrode line connected to the second common electrode,
   wherein the first common electrode line and the second common electrode line are not connected to each other in a region where each of the plurality of pixels is provided,
   wherein the retention capacitor includes a first retention capacitor disposed at the plurality of displaying subpixels and a second retention capacitor disposed at the viewing angle controlling subpixel, and
   wherein the retention capacitor line includes a first retention capacitor line connected to the first retention capacitor and a second retention capacitor line connected to the second retention capacitor,
   wherein the plurality of first retention capacitors formed at the plurality of displaying subpixels is connected to the first retention capacitor line, and
   wherein the second retention capacitor formed at the viewing angle controlling subpixel is connected to the second retention capacitor line,
   wherein the first and the second retention capacitor lines are not connected to each other in the region where each of the plurality of pixels is provided,
   wherein the first common electrode line is connected to the first retention capacitor, and
   wherein electric potentials applied to the first common electrode line and the second common electrode line are different from each other.

2. The liquid crystal display according to claim 1, further comprising:
   a first substrate;
   a pixel transistor formed on the surface of the first substrate;
   a pixel electrode electrically connected to the pixel transistor; and
   a second substrate provided to face the first substrate with a liquid crystal layer being interposed between the first and second substrates,
   wherein the common electrode is formed on a surface of the second substrate at a side of the liquid crystal layer,
   wherein the plurality of displaying subpixels and the viewing angle controlling subpixel are configured to be operated by a vertical electric field generated between the pixel electrode and the common electrode, and
   wherein, in the region where each of the plurality of pixels is provided, at least one of the common electrode and the retention capacitor is provided so that the plurality of displaying subpixels and the viewing angle controlling subpixel are electrically independent from each other.

3. The liquid crystal display according to claim 1, further comprising:
   a third substrate;
   a pixel transistor formed on the surface of the third substrate; and
   a pixel electrode provided to the third substrate and electrically connected to the pixel transistor,
   wherein the common electrode is formed on the surface of the pixel electrode of the third substrate by an insulation film,
   wherein the plurality of displaying subpixels and the viewing angle controlling subpixel are configured to be operated by a lateral electric field generated between the pixel electrode and the common electrode in each of the plurality of pixels, and
   wherein, in the region where each of the plurality of pixels is provided, at least one of the common electrode and the retention capacitor is provided so that the plurality of displaying subpixels and the viewing angle controlling subpixel are electrically independent from each other.

4. The liquid crystal display according to claim 1, further comprising a pixel electrode respectively provided to the plurality of displaying subpixels and the viewing angle controlling subpixel,
   wherein the plurality of displaying subpixels are configured to be operated by a lateral electric field generated between the pixel electrode and the common electrode in each of the plurality of pixels,
   wherein the viewing angle controlling subpixel is configured to be operated by a vertical electric field generated between the pixel electrode and the common electrode in each of the plurality of pixels, and
   wherein, in the region where each of the plurality of pixels is provided, at least one of the common electrode and the retention capacitor is provided so that the plurality of displaying subpixels and the viewing angle controlling subpixel are electrically independent from each other.

5. The liquid crystal display according to claim 1, further comprising a potential supplying unit which applies a common potential to the common electrode provided to the plurality of displaying subpixels and the common electrode provided to the viewing angle controlling subpixel.

6. The liquid crystal display according to claim 5, wherein the potential supplying unit includes a first potential supplying unit which applies a first common potential to the common electrode provided to the plurality of displaying subpixels and a second potential supplying unit which applies a second common potential to the common electrode provided to the viewing angle controlling subpixel.

7. An electronic device having a liquid crystal display, the liquid crystal display comprising:
   a plurality of pixels including a plurality of displaying subpixels corresponding to various colors and a viewing angle controlling subpixel for controlling a viewing angle;

a common electrode and a retention capacitor respectively provided to each of the plurality of pixels;

a common electrode line electrically connected to the common electrode; and a retention capacitor line electrically connected to the retention capacitor, the common electrode including a first common electrode commonly formed at the plurality of displaying subpixels and a second common electrode formed at the viewing angle controlling subpixel, wherein the common electrode line includes a first common electrode line connected to the first common electrode and a second common electrode line connected to the second common electrode, wherein the first common electrode line and the second common electrode line are not connected to each other in a region where each of the plurality of pixels is provided, wherein the retention capacitor includes a first retention capacitor disposed at the plurality of displaying subpixels and a second retention capacitor disposed at the viewing angle controlling subpixel, and wherein the retention capacitor line includes a first retention capacitor line connected to the first retention capacitor and a second retention capacitor line connected to the second retention capacitor, wherein the plurality of first retention capacitors formed at the plurality of displaying subpixels is connected to the first retention capacitor line, and wherein the second retention capacitor formed at the viewing angle controlling subpixel is connected to the second retention capacitor line, wherein the first and the second retention capacitor lines are not connected to each other in the region where each of the plurality of pixels is provided, wherein the first common electrode line is connected to the first retention capacitor, and wherein electric potentials applied to the first common electrode line and the second common electrode line are different from each other.

* * * * *